S. R. NYE.

Horse Rake.

No. 9,731. Reissued May 31, 1881.

Witnesses:
H. G. Wadlin.
W. C. Linn

Inventor:
Sherman R. Nye,
by his Att'ys.
Wright Brown

N. PETERS, Photo-Lithographer, Washington, D. C.

UNITED STATES PATENT OFFICE.

SHERMAN R. NYE, OF CHICOPEE FALLS, MASSACHUSETTS.

HORSE-RAKE.

SPECIFICATION forming part of Reissued Letters Patent No. 9,731, dated May 31, 1881.

Original No. 105,833, dated July 26, 1870; Reissue No. 6,678, dated October 5, 1875. Application for reissue filed March 22, 1881.

*To all whom it may concern:*

Be it known that I, SHERMAN R. NYE, of Chicopee Falls, in the county of Hampden, State of Massachusetts, have invented certain Improvements in Horse-Rakes, of which the following is a specification.

This invention relates to that class of horse hay-rakes in which each rake-tooth is pivoted to a holder attached to the rake-head and adapted to swing or vibrate in a vertical plane independently of the usual simultaneous motion of all the rake-teeth in dumping their accumulation of hay, each tooth being held downward with a yielding pressure by a spring, which causes the tooth to aid in gathering the hay, and at the same time permits it to yield or rise sufficiently to pass over fixed obstructions upon the surface of the ground.

My invention has for its object to enable each independently-pivoted rake-tooth of the class above mentioned to be held downward with a yielding pressure by a spring supported entirely by the holder to which the tooth is pivoted, and also to provide means for bracing each independently-pivoted tooth and limiting its independent vibration to a defined arc.

To these ends my invention consists, first, in the combination of a rake-tooth, a holder therefor in which said tooth is pivoted by a horizontal axis, and a spiral spring encircling said holder and axis, and having its ends secured relatively to the tooth to exert a downward yielding pressure upon the tooth.

It consists, secondly, in the combination, with each independently-pivoted tooth, of a brace which supports and strengthens the tooth, and acts, in conjunction with suitable stops, in such manner as to limit the independent vibrations of the tooth, all of which I will now proceed to describe.

Figure 1:
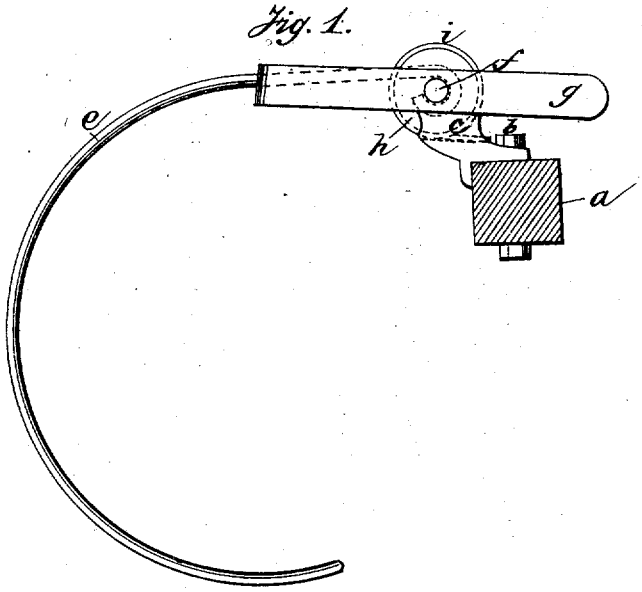
Figure 2:
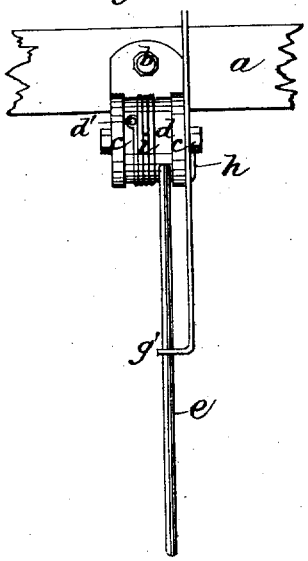
Figure 3:
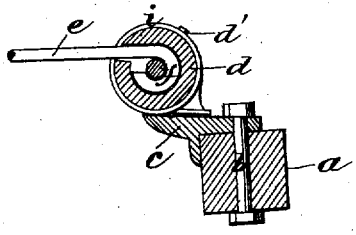

Of the accompanying drawings, forming part of this specification, Figure 1 represents a side elevation of a rake-tooth and its appurtenances as attached to a rake-head. Fig. 2 represents a plan of the parts shown in Fig. 1, and Fig. 3 represents a vertical section of the tooth-holder.

In these figures the same letters refer to corresponding parts.

It will, of course, be understood that the usual number of series of rake-teeth is attached to the rake-head *a* in the same manner as the single tooth *e*, which is sufficient alone to illustrate the invention.

In the drawings, *c* represents a casting, termed a "holder;" and *f* a bolt, through the medium of which the tooth *e* is attached to the rake-head.

*g* represents a lever or brace secured upon one end of the bolt *f*, and adapted to turn therewith, the bolt serving as a fulcrum for said lever. The rear end of the brace *g* is bent at a right angle, and the deflected part has an eye, *g'*, through which the tooth passes.

*h* represents a stop or projection upon the holder *c*, which stop limits the downward movement of the brace *g*, and thereby prevents the undue depression of the rake-tooth by the downward-impelling force of the spring *i*. The spring *i* encircles a drum, *d*, which is mounted concentrically upon the bolt *f*. An aperture extends from the circumference of the bore of the drum *d*, and the rake-tooth passes through said aperture to the bolt *f*, with which the hooked end of the tooth engages, as clearly shown in Fig. 3. One end of the spring *i* is confined between the drum *d* and the base-plate of the holder *c*, while the other end of said spring is made fast to a pin, *d'*, projecting from the drum *d*. The holder *c* consists simply of two jaws or ears cast at opposite sides of a base-plate.

The stop *h* is formed upon the outer face of one of the jaws, and between the jaws are situated the drum *d*, the spring *i*, and the end of the rake-tooth, as before explained, they being held there by means of the bolt *f*, which passes through said jaws. The base of the holder *c* is off-set upon the rake-head *a*, and screwed firmly therein by the bolt *b*.

The head *a* is movable, and it is designed to provide the rake with a lever, whereby said head may be elevated and made to rest against the heel or forward end of the brace *g*, for the purpose of holding the teeth firmly in contact with the ground, when desired. In other words, the rake-head *a*, when elevated, forms a rest or stop for the front ends of the braces *g*, and hence all the teeth may be prevented from turning with or upon their attaching-bolts when it is desired to give the teeth a more rigid or unyielding character, to suit the nature of the ground or the requirements of the work to be performed.

The rake-head, in its normal position, serves to properly limit the motion of the tooth *e* when it turns with the bolt or upon its center in overriding obstacles, because the brace *g*, when brought into contact with the rake-head, naturally arrests the upward movement of the rake-tooth upon its center.

It will be seen from the above that my improved brace not only affords vertical and lateral support to the tooth, but is concerned in maintaining its operative position and regulating its movements. When the holder *c* is detached from the rake-head *a* it may, together with the other appurtenances of the tooth, remain undetached from the rake-tooth, and while the parts are thus intact they are necessarily convenient for transportation.

Heretofore the holding-down springs of this class of rake-teeth have been so constructed as to bear upon the tooth at a considerable distance from its pivot, and as the tooth rises and falls in its independent movement this point of contact constantly changes; or, in other words, there is a constant rubbing of the spring upon the tooth, which tends to wear away the latter and cause its ultimate breakage. These springs have generally been made in two forms, one flat or curved attached to the holder of the pivoted tooth and exerting pressure upon the tooth by its effort to regain its normal position when bent, and the other spiral and applied in such manner as to exert pressure on the tooth by longitudinal expansion. These forms are both open to the objection above named, as they bear upon the tooth at a distance from its pivot, and in addition to this they are both more difficult of application than my spring, which, encircling and being supported by the holder, does not bear upon the tooth at a distance from its pivot, and is readily applied to the holder.

Having thus described my invention, what I claim, and desire to secure by Letters Patent, is—

1. The combination of a rake-tooth, a holder therefor in which the tooth is pivoted by a horizontal axis, and a spiral spring encircling said holder and axis, and having its ends secured relatively to the tooth to exert a downward-yielding pressure upon the tooth, substantially as described.

2. The combination of the drum *d*, spring *i*, holder *c*, and tooth *e*, as herein described, and for the purpose set forth.

3. The brace or lever *g*, in combination with the rake-head, the tooth, and tooth-holder, in the manner and for the purpose explained.

4. The stop *h* and brace *g*, in combination with the tooth *e*, the holder *c*, and the rake-head *a*, substantially as and for the purpose set forth.

5. The combination, with the holder adapted to be secured to a rake-head, of a rake-tooth pivoted in said holder, and a spring coiled upon said holder so as to expend its force in a plane parallel with the longitudinal axis of the tooth to exert a downward-yielding pressure upon the tooth, substantially as described.

In witness whereof I have signed my name to this specification, in the presence of two subscribing witnesses, this 14th day of March A. D. 1881.

SHERMAN R. NYE.

Witnesses:
GEO. S. TAYLOR,
JAMES H. WEST.